Dec. 8, 1931.  F. A. PARSONS  1,835,328
MILLING MACHINE SLIDE
Filed Sept. 24, 1926   2 Sheets-Sheet 1

INVENTOR
Fred G Parsons

Dec. 8, 1931.   F. A. PARSONS   1,835,328
MILLING MACHINE SLIDE
Filed Sept. 24, 1926      2 Sheets-Sheet 2
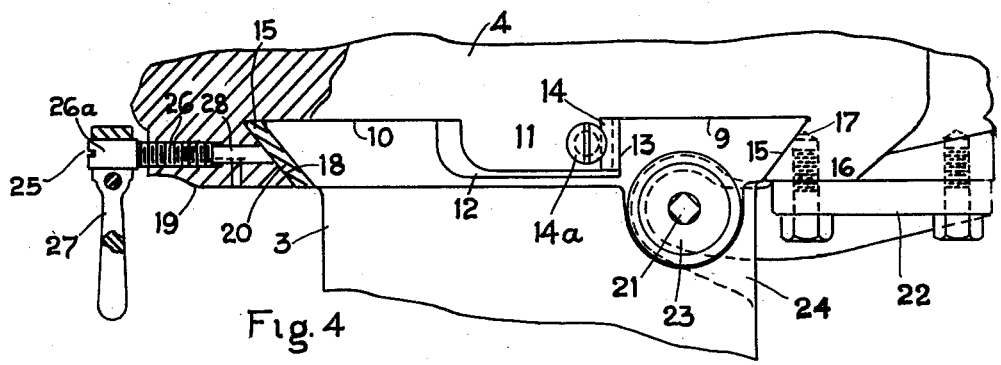
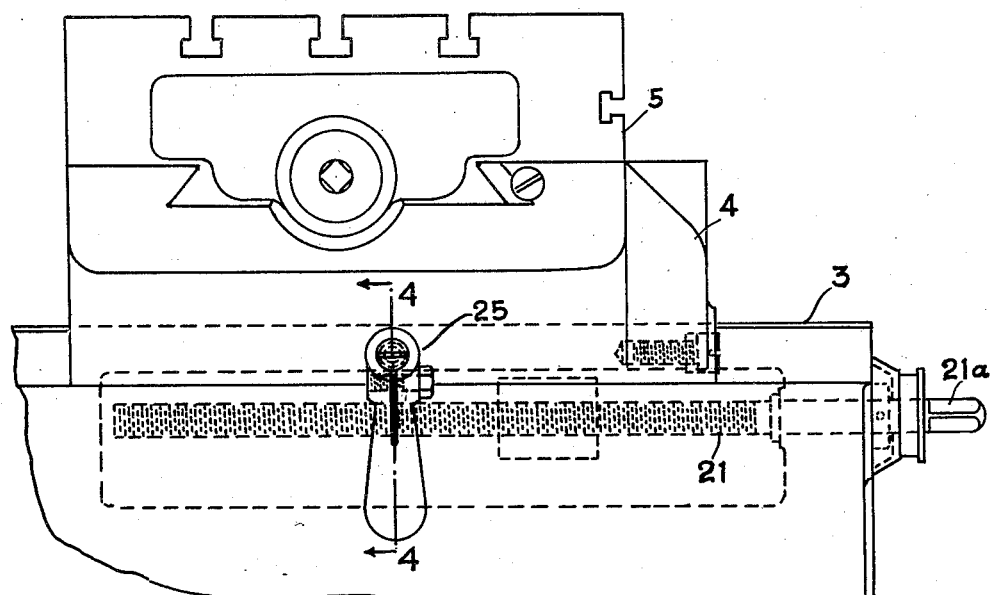
INVENTOR
Fred A. Parsons Patented Dec. 8, 1931

1,835,328

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN

MILLING MACHINE SLIDE

Application filed September 24, 1926. Serial No. 137,396.

This invention relates to improvements in a machine tool organization and more particularly to slides suitable for guiding a machine tool support in a desired path of movement.

A main purpose of the invention is to improve and simplify the construction and operation of machine tool slides and clamps therefor.

A further purpose is to provide an improved slide particularly adapted for use in guiding the saddle of a milling machine on its supporting structure and particularly adapted to be rigidly clamped therewith, the slide being of such form as to permit of effective clamp means of simple construction and great convenience of operation.

The invention consists in the particular arrangement and combination of parts as herein illustrated, described and claimed, and is to be understood to include such modified constructions as may be equivalent to the structure claimed.

In the accompanying drawings, similar characters of reference have been used for the same parts in each of the several views, of which:

Fig. 3 is an enlarged partial view from the left of Fig. 2 showing the table and saddle and a portion of the knee.

Fig. 4 is an enlargement of a portion of Fig. 2, showing a front elevation of the slide between the saddle and knee.

Figure 1:
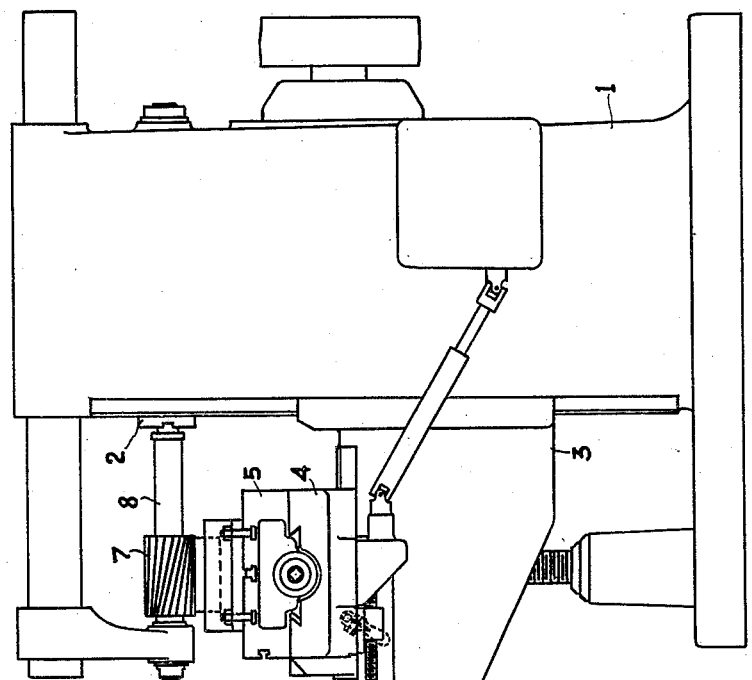
Fig. 1 is a right hand elevation of a machine tool commonly known as a knee and column type milling machine, to which my invention has been applied.

A column 1 supports a rotatable spindle 2, and a knee or support 3 slidably guided for vertical movement on the front face of the column. A saddle or support 4 is slidably guided on the top face of knee 3 for movement toward and from the column 1. A table or work support 5 is slidably guided on saddle 4 for movement to right or left in Fig. 2.

A work piece 6 is fixed on table 5 to be acted upon by a cutter 7 rotatably supported by the means of an arbor 8 driven from the spindle.

The movement of the various supports provides movement of the table and work piece relative to the cutter and spindle in three transverse directions or paths and for each of such movements, the type of machine here shown ordinarily provides transmission and control mechanism for both hand and power movement which may be of various well known forms which mainly form no part of the present invention and are therefore not shown here.

The slides or guides for movement of the knee on the column or for movement of the table on the saddle may be of any of several well known forms which are therefore not here shown in detail.

The knee 3 provides both a support and a guide for the saddle 4. The surfaces 9 and 10 of the knee are preferably in parallel planes, being here shown in substantially the same plane for convenience of manufacture, and the planes of the surfaces are parallel to the direction of movement of saddle 4. The weight of the table and saddle tends to force the saddle against these surfaces, and in the majority of machining operations a certain amount of the forces set up also acts to force the saddle in the same direction. A downwardly projecting portion 11 fixed on the saddle extends the full length thereof in the direction of saddle movement and space is provided for such portion in the form of a depression or channel 12 in the upper portion of the knee. The guiding surface 13 of the knee is parallel to the direction of movement of saddle 4 in its extension in the direction of such movement but is in a plane at a substantial angle with the plane of surface 9 in its transverse extension, in this instance substantially at right angles thereto. The opposed face of projection 11 stands at a slight angle with the surface 13 to form a seat or rigid abutment for a tapered gib 14 interposed between the opposed knee and saddle surfaces. The gib 14 is tapered to a smaller thickness at the rear and is held in place and may be adjusted rearwardly by the means of a screw 14a of well known construction for such purposes, whereby the gib is normally adjusted to fit closely between the opposed surfaces throughout its length, but loose enough to permit the saddle to slide.

A surface 15 on the knee is parallel to the movement of saddle 4 in its extension in the direction of such movement but is located in a plane at a substantial angle to the plane of surface 9 in its transverse extension. A downwardly projecting portion 16 of saddle 4 provides an opposed surface 17 closely but slidably fitted to the surface 15.

A surface 18 on the knee is parallel to the direction of saddle movement in its extension in the direction of such movement, but is located in a plane at a substantial angle with the plane of surface 9 in a transverse direction. A downwardly projecting portion 19 of the saddle provides a surface opposed to the surface 18 but slightly angular thereto to form a seat for a tapered gib 20 similar to the gib 14 and provided with a similar retaining and adjusting screw to cause the gib to fit snugly between the opposed knee and saddle surfaces while normally permitting the saddle to slide.

A certain amount of clearance must be provided between the guiding surfaces of the knee and the opposed guiding surfaces to permit of sliding. It is therefore impossible to prevent that the saddle may be tilted out of a position normal to its path of movement. Such clearance is ordinarily of definite dimensions but the possible angle of tilting may vary, the tangent of such angle being equal to the spacing apart, in a direction at right angles to the path of saddle movement, of the two knee surfaces tending to maintain the saddle in its path, divided by the length of contact between opposed surfaces in the direction of saddle movement. Thus it is highly important for accuracy of work produced, and for other reasons, that the knee surfaces which resist angular tilting, such for instance as the surfaces 13 and 15, which prevent tilting to right or left in Fig. 4, be spaced close together, since this reduces the amount of possible angular tilting to a minimum if other factors are equal.

Figure 2:
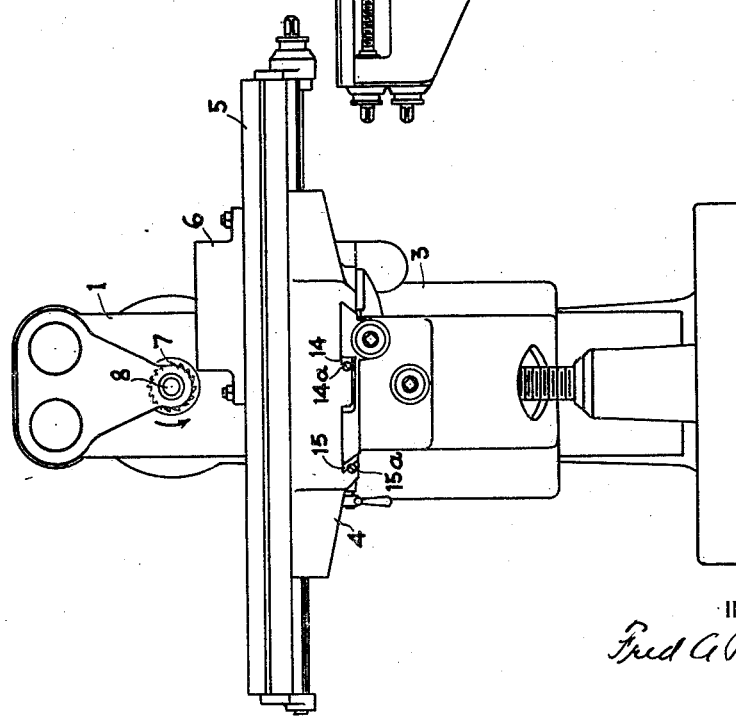
Fig. 2 is a front elevation of the same machine.

Referring to Fig. 2, it will be apparent that in the use of milling machines the cutting pressures may tend to rotate the saddle about an axis parallel with its path of movement and in a direction either clockwise or counter-clockwise accordingly as the table is moved to move the work against the cutter in the one or the other direction. The location of the axis about which such rotational forces may be considered to operate may vary in accordance with a number of factors, but it is obvious that such rotation of the saddle is best resisted by surfaces spaced relatively far apart. In this case a clockwise rotation of the saddle is resisted by the knee surfaces 18 and 9, while a counter-clockwise rotation is resisted by the knee surfaces 15 and 10, the construction thus providing, for either direction of rotative force, resisting surfaces comparatively far apart although the tilting forces are opposed by surfaces spaced comparatively close together as previously explained.

Owing to the necessary clearance previously mentioned, such rotational forces, unless prevented, may move the saddle slightly by lifting one side of the saddle away from its supporting surface as soon as the rotational force becomes greater than the unbalanced weight of the saddle and table, about the axis of rotation. Since such forces, especially in milling machines, are intermittent or fluctuating in their nature because of the tooth spacing of the cutters and for other reasons, a chatter or vibration may be set up in which the saddle is lifted from its seat momentarily when the force overcomes the unbalanced weight and is dropped back again during a next interval when the force is less than the unbalanced weight.

By the construction shown such a result is effectually prevented for at least one direction of rotative force which may be predetermined as the direction resulting from the ordinary or normal use of the machine. The force may always be resolved into two components one of which acts in a horizontal direction in Fig. 4, the horizontal components being to right or left in Fig. 4 according to the direction of rotational force. For a force tending toward counter-clockwise saddle rotation, the saddle tends to lift from its seat on surface 9, but the horizontal component of such force tends to move the saddle to the lift, and the angular surface 15 when the saddle is so moved acts to strongly force the saddle down against surface 9, thus overcoming any lifting tendency which might otherwise cause chatter as previously explained.

A saddle screw 21 is rotatably journaled in the knee 3 but is prevented from axial movement and is provided with a squared portion 21a to which a suitable crank, not shown, may be applied. A bracket 22 fixed on the saddle 4 carries a nut portion 23 in threaded engagement with the screw, whereby the saddle may be moved either manually or by any well known form of power transmission, not shown, connectible with screw 21 in any well known manner.

The screw 21 is positioned in a recess 24 in the side of the knee in a manner such that the knee portion upon which surfaces 9 and 15 are formed overhangs the screw, preventing dust or chips from lodging thereon, and the screw is positioned adjacent the guide surfaces 13 and 15 which prevent tilting action of the knee, in this instance substantially central between the two surfaces. As so arranged, there is a minimum tendency of the saddle to tilt when moved from the screw.

In the case that movement of the saddle is not required in the performance of a particular machining operation, it is desirable that the saddle and knee should be rigidly clamped together and such clamping, in order to be most effective, should force together as many as possible of the opposed sliding surfaces in order that frictional engagement may prevent movement in the path of normal saddle movement, and also that by the clamping there should be established surfaces in close contact tending to prevent both the tilting and the rotational movements previously described.

By the arrangement of surfaces here shown simplified clamping means may act to simultaneously establish the various desired conditions when clamped.

A clamp generally denoted by the numeral 25, consists of a threaded shank 26 engaging a suitable threaded bore in the saddle and when turned by the means of a handle 27 adjustably fixed on the projecting end 26a of the shank, the end of the screw may be advanced to press against a sliding shoe 28, which then presses against the gib 20 to which it is fitted. The gib is then forced to the right in Fig. 4 to strongly engage the knee surface 18 and owing to the angular disposition of surface 18 the saddle is also pulled downwardly to strongly engage with the knee surface 10. At the same time the saddle is shifted a trifle to the left in Fig. 4 causing the opposed surfaces 15 and 17 to engage strongly while the angular disposition of surfaces 15 and 17 pulls the saddle down to strong engagement with knee surface 9. When the lever 27 is turned in the other direction the parts again assume a sliding relationship. It will be noted that, when the saddle is clamped it is the knee surfaces 15 and 18 which prevent tilting of the saddle to right or left in Fig. 4, and although such surfaces are spaced relatively far apart, such a condition is not objectionable for the clamped saddle. When unclamped for saddle movement the relatively close spaced surfaces 13 and 15 again control the amount of saddle tilting as previously explained.

From the foregoing it will be seen that the arrangement of saddle and knee surfaces shown provides a maximum resistance against any deflection of the saddle from its normal position both when clamped and when unclamped and with a great simplicity of construction and operation both of guide surfaces, adjusting means and clamping means, while permitting the saddle screw to be positioned in the most desirable position relative to such surfaces.

It will be noted that the guide surfaces may be considered to consist of groups one of which consists of knee surfaces 9—13—15, together with the opposed surfaces and the other of which consists of surfaces 10 and 18 together with the opposed surfaces.

Having now fully disclosed my invention, I claim:

In a milling machine the combination of a movable work table, a tool spindle rotatably supported at a level above said table and axially horizontal, a movable saddle providing slideways for guiding the movement of said table, a support providing saddle guide means including a first group of saddle guiding surfaces and including a second group of saddle guiding surfaces, said groups being spaced apart horizontally in a direction transverse to the axis of said spindle, each of said groups providing different surfaces in different planes, the surfaces of said first group providing rigid abutments limiting saddle displacement in either horizontal direction transverse to the spindle axis, the surfaces of said second group providing clearance between said saddle and support in the direction of said first group whereby to limit saddle displacement in one only of the last mentioned directions, and clamp means including a movable element associated with said second group of surfaces and adapted invariably during movement of said element to establish frictional clamping pressure between a plurality of surfaces in each of said groups and complementary surfaces associated with said saddle, the arrangement of the surfaces engaged during clamping being such that the clamping movement of said element positions said saddle to the limit of its downward movement relative to said support and simultaneously moves said saddle to the limit of its movement in a horizontal direction transverse to the axis of said spindle.

In witness whereof I hereto affix my signature.

FRED A. PARSONS.